United States Patent [19]

Wall

[11] 4,208,934
[45] Jun. 24, 1980

[54] MITER SAW MACHINE

[76] Inventor: Leslie W. Wall, P.O. Box 1425, Brownwood, Tex. 76801

[21] Appl. No.: 22,345

[22] Filed: Mar. 20, 1979

[51] Int. Cl.² .............................................. B27B 5/20
[52] U.S. Cl. .................................. 83/468; 83/471.1; 83/471.3; 83/490; 83/581
[58] Field of Search .................. 83/467 R, 468, 471.1, 83/471.3, 477.1, 490, 581

[56] References Cited

U.S. PATENT DOCUMENTS 2,872,955  2/1959  Schmitz et al. ...................... 83/471.3

Primary Examiner—J. M. Meister
Attorney, Agent, or Firm—Clarence A. O'Brien; Harvey B. Jacobson

[57] ABSTRACT

Precise adjustment in the angular relationship between the converging paths of a pair rotary saw blades, is accommodated by the pivotal mounting of each motor driven saw blade assembly on an adjustment support plate carried by a common base fixed to the cabinet frame of a miter saw machine. The support plates are angularly adjustable about pivot pins having vertical axes perpendicular to the pivotal axes of the saw blade assemblies and intersecting the rotational axes of the saw blades.

9 Claims, 14 Drawing Figures

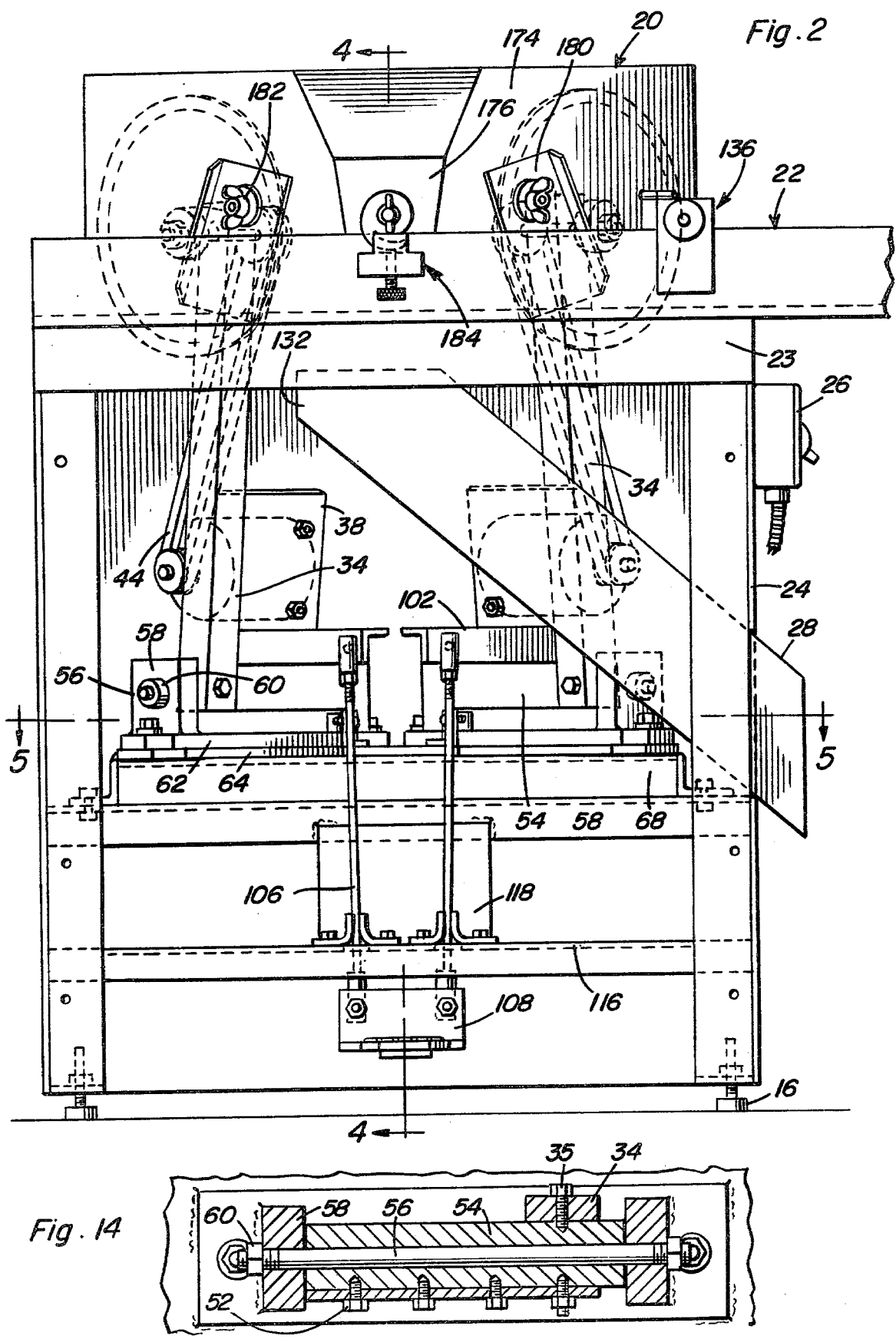

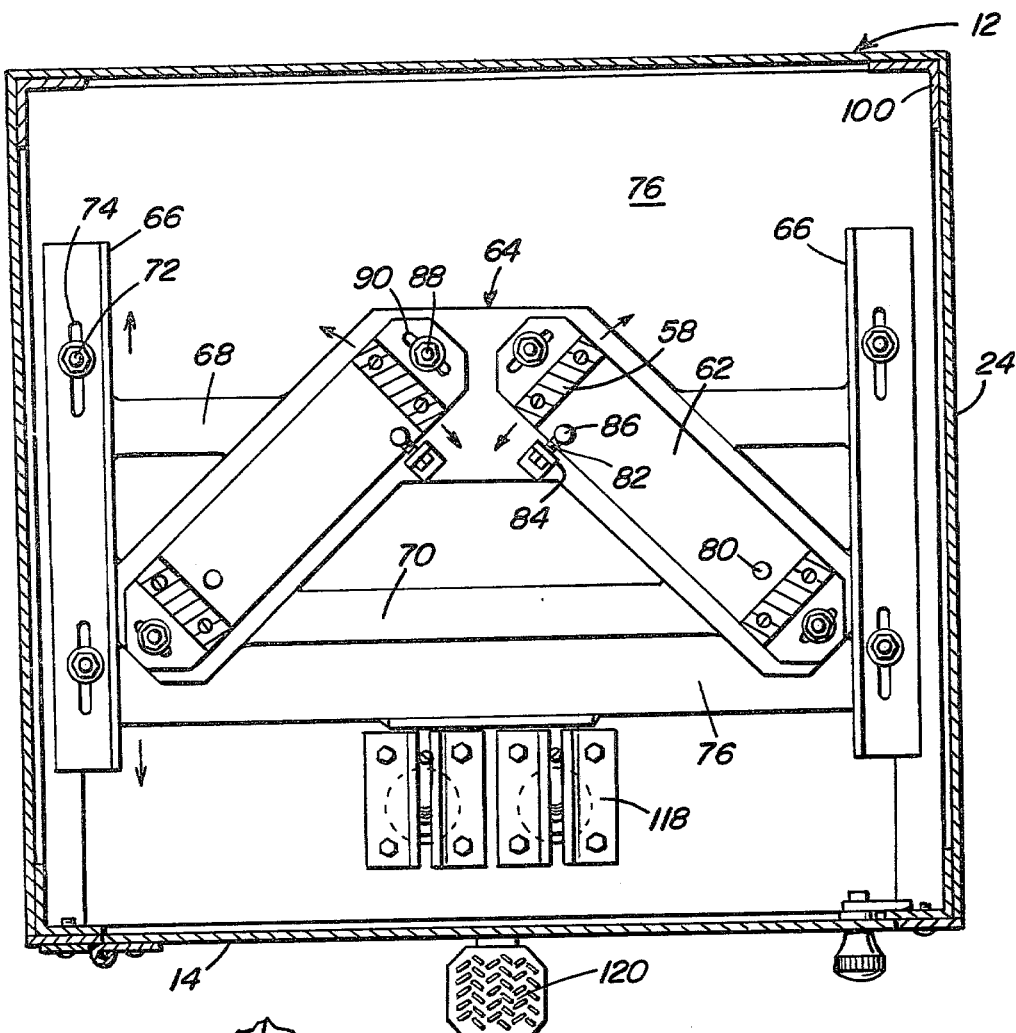
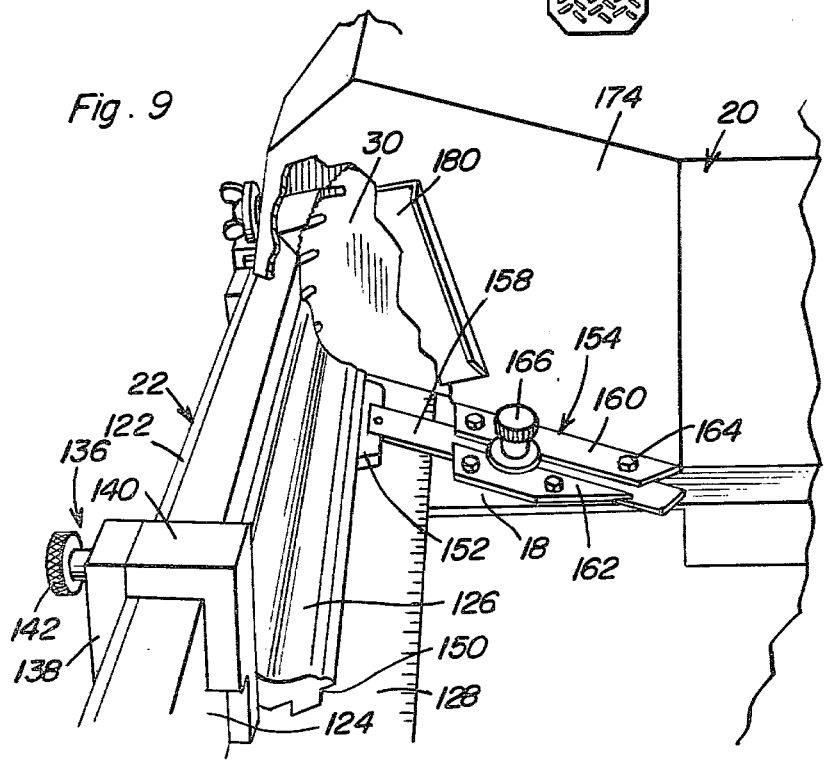
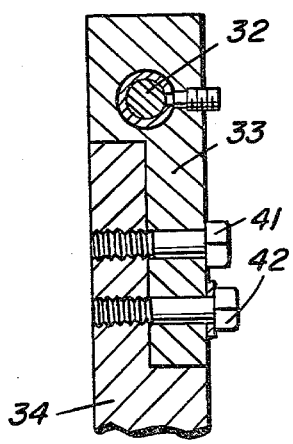

MITER SAW MACHINE

BACKGROUND OF THE INVENTION

This invention relates to improvements in miter saw machines of the type designed to cut the corner ends of molding sections used in the making of picture frames.

Miter saw machines of the type in which a pair of rotary saw blades are simultaneously advanced along converging paths toward a guide fence to cut the 45 degree end edges of abutting molding sections of a picture frame, have been in public use for some time. Such a miter saw machine is disclosed in U.S. application Ser. No. 571,795, filed Aug. 11, 1966, now abandoned. A serious problem arising from the continued use of such machines resides in the maintenance of precision cutting of the molding sections, which is an absolute necessity for an acceptable fit in the making of picture frames. The adjusted angular positions and orientations of the rotary saw blades change as a result of wear and replacement of blades. Very often the readjustment of one saw blade disturbs all other adjustments. The same is true with respect to the positioning of the molding sections on the guide fence for cutting.

It is, therefore, an important object of the present invention to provide improved means for making adjustments in a miter saw machine of the aforementioned type so as to maintain precision cutting of molding sections.

SUMMARY OF THE INVENTION

In accordance with the present invention, each of the vertical posts rotatably carrying rotary saw blades are pivotally mounted on separate support plates adjustably positioned on a common base fixed to the cabinet frame of the miter saw machine. Each of the support plates is pivotally connected to the base by a dowel pin for angular adjustment about vertical axes in intersecting perpendicular relation to the pivotal axes about which the saw blades are advanced toward the guide fence. The converging paths of movement of the saw blades may thereby be adjusted to the 45 degree angle relative to the guide fence against which the molding is positioned during the cutting operation. Further, the vertical adjustment axes intersect the rotational axes of the saw blades at the upper ends of vertical posts. Parallelism between the rotational and pivotal axes of each saw blade is obtained by angular adjustment of the post relative to the motor mounting plate to which the post is secured for pivotal mounting on its support plate.

A pair of limit stops are clamped to the guide fence at adjusted locations to position the molding for cutting two different lengths without readjustment of the stops. The engagement arm of the stop associated with the shorter length molding section to be cut is, therefore, pivotally retracted from the fence when the longer molding section is placed in position on the fence for cutting. A holder having a pivotal edge engaging element is utilized to position shell type molding against the fence in the same angular position cross-sectionwise.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 2 is a front elevation view of the miter machine shown in FIG. 1 with the front access panel removed.

FIG. 5 is a top section view taken substantially through a plane indicated by section line 5—5 in FIG. 2.

FIG. 9 is an enlarged perspective view of a portion of the machine with part of the hood broken away showing the rear side of the guide fence with a piece of molding in cutting position thereon.

FIG. 13 is an enlarged partial section view taken substantially through a plane indicated by section line 13—13 in FIG. 6.

FIG. 14 is a partial section view taken substantially through a plane indicated by section line 14—14 in FIG. 6.

DESCRIPTION OF THE PREFERRED EMBODIMENTS

Figure 1:
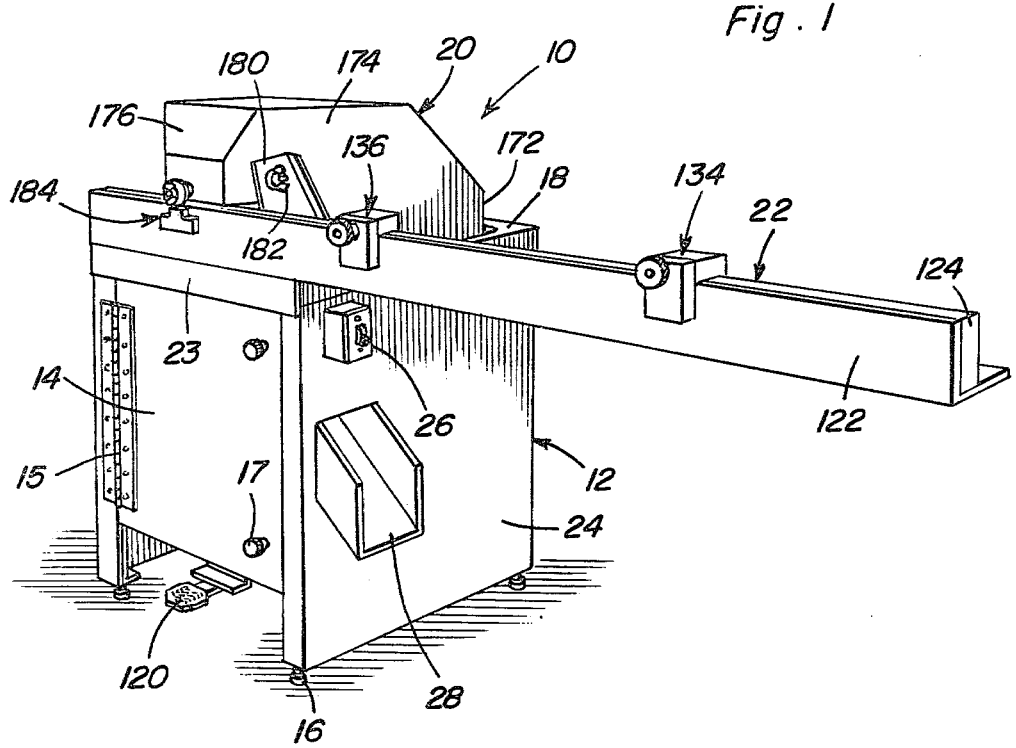
FIG. 1 is a perspective view showing the improved miter saw machine of the present invention.

Referring now to the drawings in detail, reference numeral 10 in FIG. 1 generally denotes the machine of the present invention which includes a frame or cabinet 12 having four levelling feet 16 and a flat horizontal support surface or top 18. A safety hood 20 is secured to the top 18 while an elongated guide fence 22 is fixed thereto along the front edge bar 23 above panel 14 and extends laterally from the side wall 24 of the cabinet above switch assembly 26 mounted on the side wall. A discharge chute 28 extends at a downward incline from the side wall 24. An access panel 14 is pivotally mounted on the front of the cabinet by hinge 15 and is locked in place by screw knobs 17. A similar hinged access panel is provided for the back of the cabinet.

Figure 3:
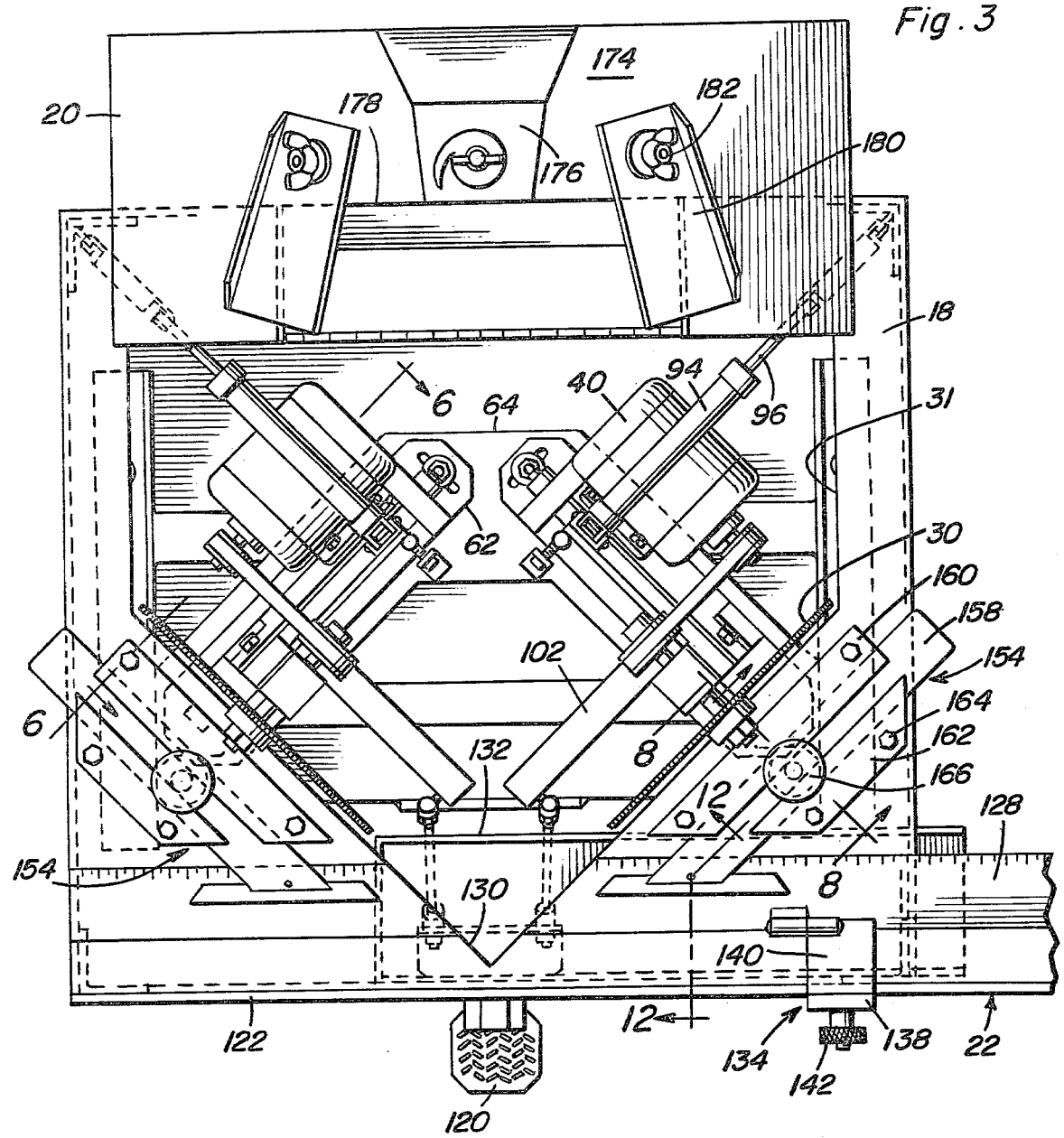
FIG. 3 is a top plan view of the miter machine with the hood in the open position.

As best seen in FIG. 3, a pair of circular saw blades 30 project upwardly through an opening 31 in the top 18 and are aligned with vertical planes at right angles to each other and at 45 degree angles to the front edge. Each blade 30 is secured to a drive shaft 32 rotatably supported by a pivotally adjustable mounting section 33 at the upper end of a vertical support post 34 as more clearly seen in FIGS. 4, 6 and 13. The lower end portion of each post 34 is secured by a fastener 35 to a pivot block 54 and by a plurality of fastener assemblies 36 to a mounting plate 38 to which an electric motor 40 is bolted. A pivot bolt 41 and an adjustment bolt assembly 42 interconnect the mounting section 33 and post 34. The motor 40 is drivingly connected by means of an endless drive belt 44 to the saw blade drive shaft 32. Pulleys 46 and 48 are connected to the drive shaft 32 and motor shaft, respectively, and have the belt 46 entrained thereabout. A pair of motor driven saw blade assemblies are thus formed.

Figure 6:
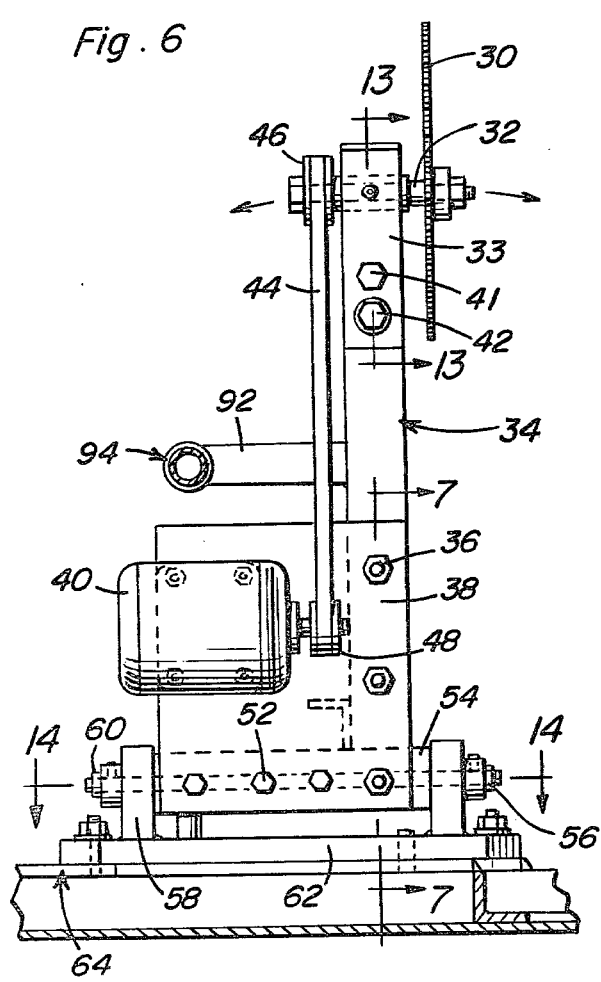
FIG. 6 is an enlarged partial section view taken substantially through a plane indicated by section line 6—6 in FIG. 3.
Figure 7:
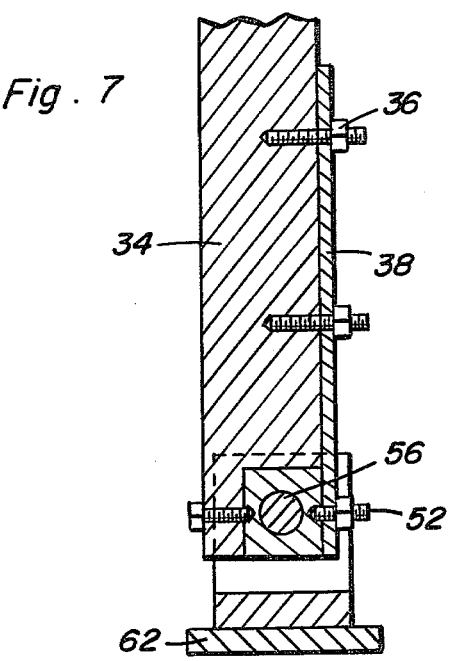
FIG. 7 is an enlarged partial section view taken substantially through a plane indicated by section line 7—7 in FIG. 6.

With continued reference to FIG. 6, the lower end portion of each motor mounting plate 38 is secured by fasteners 52 to the pivot block 54 through which a pivot shaft 56 extends. The pivot axis extending through the pivot shaft 56 must be exactly parallel to the axis of the saw blade drive shaft 32. Should adjustment become necessary to establish such parallelism, such adjustment may be effected independently of any other adjustments by loosening the bolt assembly 42 and pivotally displacing section 33 about the pivot axis of bolt 41 until parallelism is established. The bolt assembly 42 may then be tightened to lock section 33 relative to post 34 in the precise angular position corresponding to the parallel relationship of the drive and pivot shafts. The pivot shaft 56 is journaled in a pair of bearing blocks 58 between which the pivot block 54 is positioned. Collars 60 are secured to the ends of shaft 56 to hold the shaft in assembled position. The bearing blocks 58 are secured to and project upwardly from an adjustment support plate 62.

As more clearly seen in FIG. 5, the two adjustment support plates 62 are positioned on a common base plate 64 in adjusted right angle relationship to each other between laterally spaced angle bars 66 interconnected by cross beams 68 and 70 underlying the base plate and secured thereto by welding. By means of fastener assemblies 72 extending through slots 74 formed in the angle bars 66, the base plate 64 and the motor saw blade assemblies carried thereon may be adjustably positioned in a forward or rearward direction and locked in position to the support shelf 76 within the cabinet. Dowel pins 80 secured to the base plate 64 pivotally mount the support plates 62 for angular adjustment about vertical axes aligned with the planes of the saw blades 30 carried on the support plates. The angular position of each support plate about its dowel pin 80 may be varied with precision by means of a screw 82 threadedly carried by a bracket 84 secured to the base plate and engaging a pin 86 on the support plate remote from dowel pivot pin 80. The adjustment support plate is locked in its adjusted position on the base plate by a pair of fastener assemblies 88 extending through slots 90 adjacent opposite longitudinal ends of the support plates.

Figure 4:
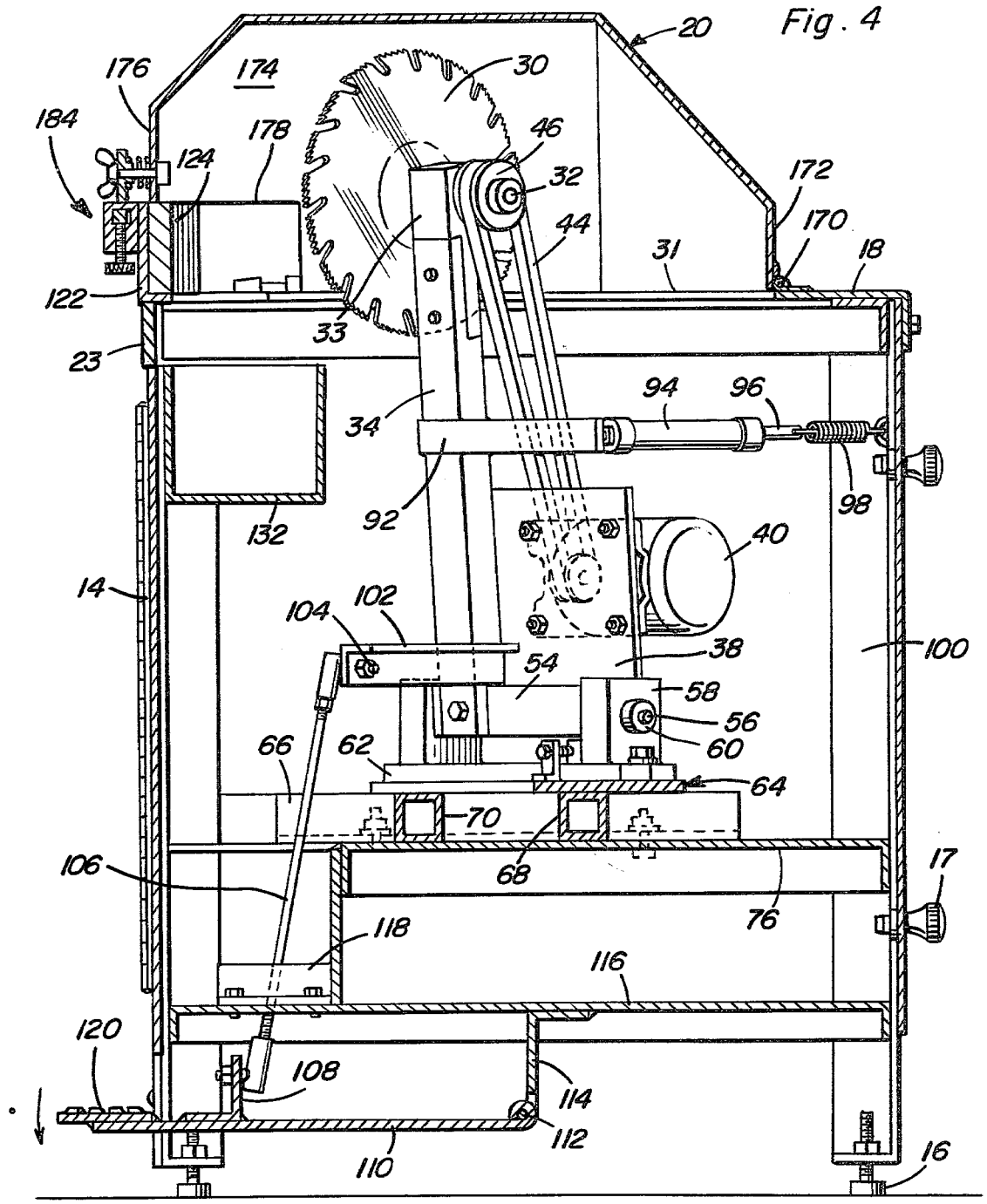
FIG. 4 is a side section view taken substantially through a plane indicated by section line 4—4 in FIG. 2.

To yieldably hold each of the saw blades in a retracted position as shown in FIGS. 3 and 4, each post 34 has a connecting bar 92 extending laterally therefrom to which one end of a shock absorbing unit 94 is anchored. The shock absorbing unit 94 is of well-known construction and has a piston rod 96 projecting therefrom connected to one end of a retraction spring 98. The springs 98 are anchored to the corner posts 100 of the cabinet. The posts 34 are simultaneously displaceable about the axes of pivot shafts 56 against the bias of spring 98 to advance the saw blades 30 forwardly toward the guide fence 22 along the rotational planes of the saw blades. Toward that end each post 34 has an arm 102 extending forwardly therefrom in parallel relation to the saw blade 30 and shock-absorbing unit 94 as more clearly seen in FIG. 3. A fastener 104 pivotally secures the forward end of each arm 102 to the upper end of a connecting rod 106 as shown in FIG. 4. The lower end of each connecting rod is pivotally connected to a common bracket 108 welded to the top of a treadle plate 110. The treadle plate is pivotally connected by means of a hinge 112 to a bracket 114 depending from the underside of the lowermost cabinet shelf 116. Two pairs of guide brackets 118 are secured to the shelf 116 adjacent the front access panel 14 to form guide slot extensions through which the connecting rods 106 extend. A foot pad 120 is secured to the forward end of the treadle plate projecting forwardly from the cabinet. Thus, the foot of the operator merely depresses the foot pad 120 to cause both posts 34 to swing forwardly and advance the saw blades toward the guide fence from retracted positions.

The guide fence 22 includes an elongated right angle cross section member 122 to which a backstop member 124 is secured to form a surface against which molding 126 is placed as shown in FIG. 9, resting on the horizontal leg 128 of the member 122. A portion of the leg 128 and backstop 124 are cut out at 130 as viewed in FIG. 3 to form a right angle notch into which the saw blades 30 are simultaneously advanced for cutting the molding. The direction of travel of the blades 30 along their arcuate paths is such as to urge the molding or workpiece downwardly and forwardly to assist in holding the molding stationary against the fence. The notch 130 overlies the opening of a dust and chip collector 132 connected to the upper end of the discharge chute 28 which extends at an angle from the front bar 23 to which it is connected through the side wall 24 of the cabinet as best seen in FIG. 2.

Figure 10:
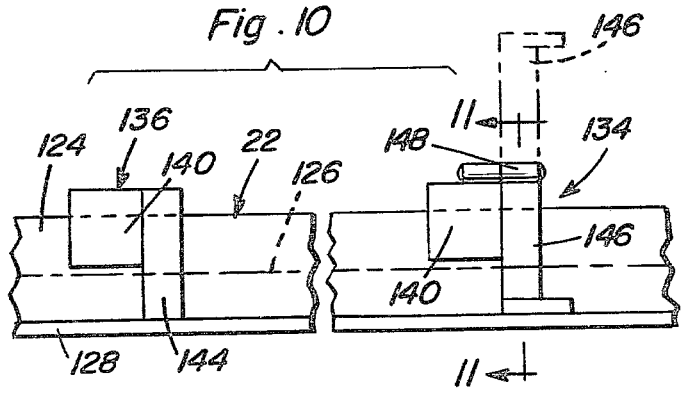
FIG. 10 is a partial rear elevation view of the guide fence showing the limit stops thereon.
Figure 11:
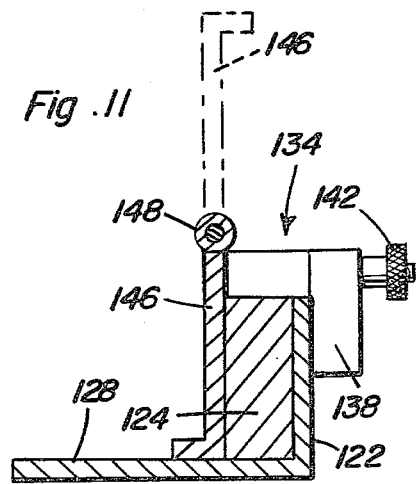
FIG. 11 is a transverse section view taken through a plane indicated by section line 11—11 in FIG. 10.

A pair of adjustable stops 134 and 136 are positioned on the fence as shown in FIG. 1 to accommodate molding of different lengths. Long and short pieces of molding of different lengths may thereby be cut to form a frame assembly without changing the positions of the stops. Both stops include a front plate 138 from which a clamp member 140 extends over the backstop 124 to which it is locked in adjusted position by a knob 142. The laterally outer stop 136 has a stop bar 144 fixed thereto as shown in FIG. 10, against which a long piece of molding 126 may abut. The laterally inner stop 134, on the other hand, has a stop bar 146 pivotally connected to the clamp 140 by a hinge 148, against which a shorter piece of molding is adapted to abut. The hinged stop bar 146 is retracted upwardly as shown by dotted line in FIGS. 10 and 11 when the longer molding section is being cut so as to avoid changing stop positions for more precise cutting of the molding sections.

Figure 8:
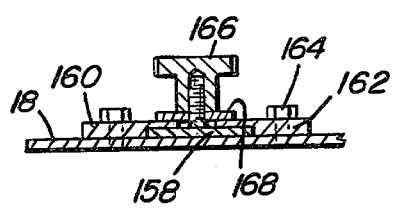
FIG. 8 is a partial section view taken substantially through a plane indicated by section line 8—8 in FIG. 3.
Figure 12:
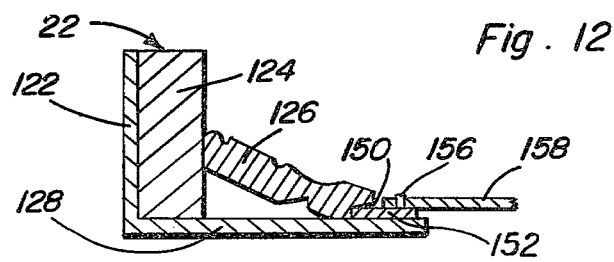
FIG. 12 is a cross section view of the guide fence showing the positioning of a shell type molding thereon by one of the holders associated with the machine.

The molding 126 shown in FIG. 9 is of the shell type and requires precise positioning thereof against the backstop 124 to hold it at the same angle cross-sectionwise each time it is cut. Toward that end, the rabbit edge 150 of the molding is engaged by an element 152 of a holder generally referred to by reference numeral 154 in FIG. 9. The edge engaging element 152 is connected by a pivot 156, as more clearly seen in FIG. 12, to the forward end of a flat bar 158 slidably mounted between a pair of track elements 160 and 162 secured to the top 18 of the cabinet by fasteners 164 so as to guide movement of the bar 158 along a path parallel to that of the associated saw blade 30. The bar 158 is locked in position by a lock knob 166 threadedly receiving a screw shank projecting from the bar 158 as shown in FIG. 8. The knob 166 bears against a clamp disc 168 to lock the bar in position for holding the molding section in place by means of the edge engaging element 152 as aforementioned. It will be apparent from FIG. 3 that two holders 154 are provided for association with each of the two saw blades.

The safety hood 20 is shown in closed and open positions respectively in FIGS. 2 and 3. The hood is pivotally connected to the top 18 by a hinge 170 at its rear wall 172 as shown in FIG. 4. The sides 174 of the hood converge forwardly to a front wall 176, the lower edge of which rests on the guide fence in the closed position enclosing the space above the saw blades to protect the operator. Openings 178 in the side walls 174 extend rearwardly from the lower edge of the front wall 176 so as to permit insertion and withdrawal of molding sections. Safety shields 180 are adjustably secured to the side walls by wing nut fasteners 182 so as to partially block the openings 178 during the cutting operation. The convergence of the side walls and the dimensions and shape of the hood 20 relative to the saw blades is such as to prevent it from being displaced between its open and closed positions except in the retracted positions of the saw blades. Further, a safety latch 184 locks the hood in its closed position as shown in FIGS. 1 and 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a miter saw machine having a frame, a guide fence fixed to the frame and a pair of rotary saw blades, means mounting said saw blades for movement along converging paths, comprising a base fixed to the frame, a pair of adjustable supports, means pivotally connecting said support to the base for angular adjustment about parallel spaced vertical adjustment axes, a pair of posts respectively carrying said saw blades, pivot means connecting said posts to the supports for displacement of the saw blades about pivotal axes intersecting said vertical adjustment axes, bearing means mounting the saw blades on said posts for rotation about rotational axes intersecting the adjustment axes, and means for locking the supports in angularly adjusted positions on the base establishing intersection of said converging paths of the saw blades at the guide fence.

2. The combination of claim 1 including adjustable means mounted on the posts for establishing a parallel relationship between the rotational and pivotal axes associated with each of the posts, whereby said saw blades are maintained coplanar with the adjustment axes.

3. The combination of claim 2 wherein said adjustable means includes a mounting section carrying each of the saw blades, and releasable fastener means for connecting each of the mounting sections to one of the posts in angularly adjusted relation.

4. The combination of claim 3 including precision adjustment means for angularly displacing the supports to the adjusted positions on the base.

5. The combination of claim 4 including a workpiece holder mounted on the frame adjacent to each of the saw blades, means for adjustably displacing the holder along a path parallel to the path of movement of the saw blade, and a work-engaging element pivotably connected to the holder adjacent to the guide fence.

6. The combination of claim 5 including two stops locked in adjusted position on the guide fence, having work-engaging abutment elements, the abutment element on one of the stops being pivotally retractable from the guide fence.

7. The combination of claim 1 including precision adjustment means for angularly displacing the supports to the adjusted positions on the base.

8. The combination of claim 1 including a workpiece holder mounted on the frame adjacent to each of the saw blades, means for adjustably displacing the holder along a path parallel to the path of movement of the saw blade, and a work-engaging element pivotally connecting to the holder adjacent to the guide fence.

9. The combination of claim 1 including two stops locked in adjusted position on the guide fence, having work-engaging abutment elements, the abutment element on one of the stops being pivotally retractable from the guide fence.

* * * * *